United States Patent
Zhou et al.

(10) Patent No.: US 9,262,283 B2
(45) Date of Patent: Feb. 16, 2016

(54) METHOD FOR READING KERNEL LOG UPON KERNEL PANIC IN OPERATING SYSTEM

(71) Applicants: Inventec Appliances (Pudong) Corporation, Shanghai (CN); INVENTEC APPLIANCES CORPORATION, New Taipei (TW); Inventec Appliances (Jiangning) Corporation, Nanjing (CN)

(72) Inventors: Haoliang Zhou, Nanjing (CN); Yexin Chen, Nanjing (CN); Yongcai Bian, Nanjing (CN)

(73) Assignees: Inventec Appliances (Pudong) Corporation, Shanghai (CN); INVENTEC APPLIANCES CORP., New Taipei (TW); Inventec Appliances (Jiangning) Corporation, Nanjing (CN)

(*) Notice: Subject to any disclaimer, the term of this patent is extended or adjusted under 35 U.S.C. 154(b) by 141 days.

(21) Appl. No.: 14/072,181

(22) Filed: Nov. 5, 2013

(65) Prior Publication Data
US 2014/0129875 A1 May 8, 2014

(30) Foreign Application Priority Data
Nov. 8, 2012 (CN) .......................... 2012 1 0444344

(51) Int. Cl.
*G06F 11/00* (2006.01)
*G06F 11/14* (2006.01)

(52) U.S. Cl.
CPC .................... *G06F 11/1471* (2013.01)

(58) Field of Classification Search
CPC . G06F 11/0778; G06F 11/366; G06F 11/079; G06F 11/0712; G06F 11/3636; G06F 11/3476; G06F 11/362; G06F 11/1441; G06F 11/0709; G06F 11/0769; G06F 11/1417; G06F 11/1438; G06F 11/34; G06F 11/076
See application file for complete search history.

(56) References Cited

U.S. PATENT DOCUMENTS

| 5,537,572 A * | 7/1996 | Michelsen et al. | ............ 711/135 |
| 2011/0004780 A1 * | 1/2011 | Hirata | .............................. 714/2 |

* cited by examiner

*Primary Examiner* — Jason Bryan
(74) *Attorney, Agent, or Firm* — Muncy, Geissler, Olds & Lowe, P.C.

(57) ABSTRACT

A method for reading a kernel log upon a kernel panic in an operation system is applicable to a computing device including a processing unit and a storage unit, coupled to the processing unit, for storing the kernel and including a log backup partition and a user data partition. The method includes the computing device performing the operating system by the kernel; the computing device generating a kernel log upon performing the operating system, and writing the kernel log into the log backup partition; and upon a kernel panic occurring and then the processing unit being reset, the computing device performing a kernel initialization procedure including reading and then writing the kernel log in the log backup partition into the user data partition, wherein the kernel log in the log backup partition includes information of a process of operating the kernel before the processing unit is reset.

10 Claims, 5 Drawing Sheets

```
/system/bin/insmod /system/lib/modules/printk2glog.ko   // Loading the kernel initialization procedure echo 0x100000@0x2FE00000 > /proc/glog   // Sending capacity and starting address of a log backup
                                           partition to the procedure for j in { 1 2 3 4 5 6 7 8 9 10 11 12 13 14 15 16 };   // Introducing data of a kernel log to a userdata partition
do
for i in { 1 2 3 4 5 6 7 8 9 10 11 12 13 14 15 16 };
do
cat /proc/giog >> /data/corelog/glog.txt
done
done
```

METHOD FOR READING KERNEL LOG UPON KERNEL PANIC IN OPERATING SYSTEM

CROSS-REFERENCE TO RELATED APPLICATION

This application claims the benefit of China Patent Application No. 201210444344.2, filed on Nov. 8, 2012, in the State Intellectual Property Office of the People's Republic of China, the disclosure of which is incorporated herein in its entirety by reference.

BACKGROUND OF THE INVENTION

1. Field of the Invention

The present invention generally relates to a method for reading a kernel log upon a kernel panic in an operating system, in particular to a method of retrieving the kernel log substantially completely after a processing unit being reset.

2. Description of the Related Art

Since Linux has the features of free software and open source, users or companies can use the source codes at the lowest level of a Linux kernel (or an Linux internal kernel) or modify system software and updated system software freely by following the contents of GNU General Public License (GNU GPL or GPL). Since Linux allows users (including both individual and corporate users) to customize the operating system flexibly, Linux would become a platform for different open or closed systems and be used in middleware or embedded systems. Accordingly, most of modern electronic products (e.g., computers, smart phones, navigation systems) come with system software developed and designed by applying the Linux kernel. For instance, the Android system is a representative example.

In general, if an application program has a nonfatal runtime error during the operation of Linux kernel, the Linux kernel can process the error and allows the application program to generate an error message after executing the application program. However, when a hardware error (such as irq conflict, bad block, or high temperature) occurs or the application program has an irreversible error (or fatal error) such as Divide By Zero, Access Denied or Buffer Overflow, a kernel panic may occur so that the Linux kernel may not be operated normally, thereby the system is crushed. Therefore, users generally need to read the content of the kernel log in order to find out the cause of the kernel panic so as to solve the problem successfully. The so-called "kernel log" refers to the information recorded by the system during the execution process of a (e.g. Linux) kernel, wherein the information of the execution process is saved in an internal buffer and contains date and time of the occurring event, host name or IP address of the occurring event, service name or function name activating the event, or the actual data content of the message of the occurring event, so that the users may know about the operation status of each software or hardware of a computing device.

When there is no kernel panic, the users may output the kernel log by a "cat/proc/kmsg" command to check the execution status of Linux kernel. However, when there is a kernel panic, the aforementioned "cat/proc/kmsg" command may not be able to output the whole kernel log, such that the user cannot accurately determine the cause of the kernel panic. Therefore, the Linux kernel provides a panic mechanism and a kdump mechanism for the kernel panic as described below:

(1) Panic Mechanism: When the kernel panic occurs, the Linux kernel does not know how to carry out the next step of the current program, so that the Linux kernel displays all the information available, and indeed the amount of displayed contents varies according to different causes of the kernel panic. For example, when the type of kernel panic is a hard panic, users can obtain a stack trace message by a "/var/log/messages" command and the users can further search an application program log to obtain the operation process of each application program. Finally, the users may record the dump information displayed on a screen of the computing device themselves. In addition, when the type of kernel panic is a soft panic, the Linux kernel generates dump information including kernel symbols data, and the dump information is recorded in the /var/log/messages, so that the users may generate a ksymoops file by a ksymoops tool to convert the kernel symbols data into readable data.

(2) kdump Mechanism (Kernel Panic Dumping Mechanism): When there is a kernel panic, a kexec program is executed to introduce the current kernel of the operating system, which is the kernel having the kernel panic and hereinafter referred to as the "previous" kernel, to another backup kernel. Now, the memory mirroring content of the previous kernel during operation will be saved into /proc/vmcore, so that users can copy the vmcore file to a flash drive through a "cp" or "scp" command. After the operating system is reset, an analysis tool is used to analyze the vmcore file to look up the cause for the kernel panic of the previous kernel.

In summation, related settings of the Linux kernel are required regardless of the panic mechanism or kdump mechanism, and users need to send out several commands before obtaining the kernel log, thereby being very inconvenient in operation. Therefore, it is an important subject for related industries to design a method of outputting the kernel log more conveniently without the complicated additional setup procedure of the system kernel by the users.

SUMMARY OF THE INVENTION

In view of the drawbacks of the conventional method of outputting kernel log that requires related system setup of kernel and has much inconvenience for the inexperienced users, the inventor of the present invention based on experience in the related industry to conduct researches and experiments finally to invent a method for reading a kernel log upon a kernel panic in an operating system.

Therefore, it is an objective of the present invention to provide a method for reading a kernel log upon a kernel panic in an operating system. An advantage of the method is to provide a more convenient way of outputting a kernel log and improving the convenience of use significantly.

Another objective of the present invention is to provide a method for reading a kernel log upon a kernel panic in an operating system to achieve the results of simplifying the complexity of outputting the kernel log and maintaining the integrity of the kernel log to facilitate users to read the content of the kernel log and solve related problems quickly after the kernel panic of the operating system occurs.

The method is applicable to a computing device including a processing unit and a storage unit electrically coupled to the processing unit and including a log backup partition and a user data partition, wherein the storage unit is for storing the kernel. The method includes the computing device performing the operating system by the kernel; the computing device generating a kernel log upon performing the operating system and writing the kernel log into the log backup partition; upon a kernel panic occurring and then the processing unit being reset, the computing device performing a kernel initialization procedure including reading and then writing the kernel log in the log backup partition into the user data partition, wherein the kernel log in the log backup partition includes information of a process of operating the kernel which operating is before the processing unit is reset.

Therefore, an advantage is that a user just needs to reset the processing unit, such as the hardware reset through a reset pin of the processing unit, in order to read and write the kernel log into the user data partition, thereby facilitating the user to know the reasons of the kernel panic by analyzing the content of the kernel log.

To make it easier for Examiner to understand the objectives, technical characteristics and effects of the present invention, preferred embodiments accompanied by drawings are provided as follows.

BRIEF DESCRIPTION OF THE DRAWINGS

The detailed structure, operating principle and effects of the present invention will now be described in more details hereinafter with reference to the accompanying drawings that show embodiments of the invention and are briefly described as follows.

DETAILED DESCRIPTION OF THE PREFERRED EMBODIMENTS

The contents and details of the present invention will become apparent to one of ordinary skill in the art after reading the following detailed description of embodiments of the invention with reference to the accompanying drawings.

Figure 1:
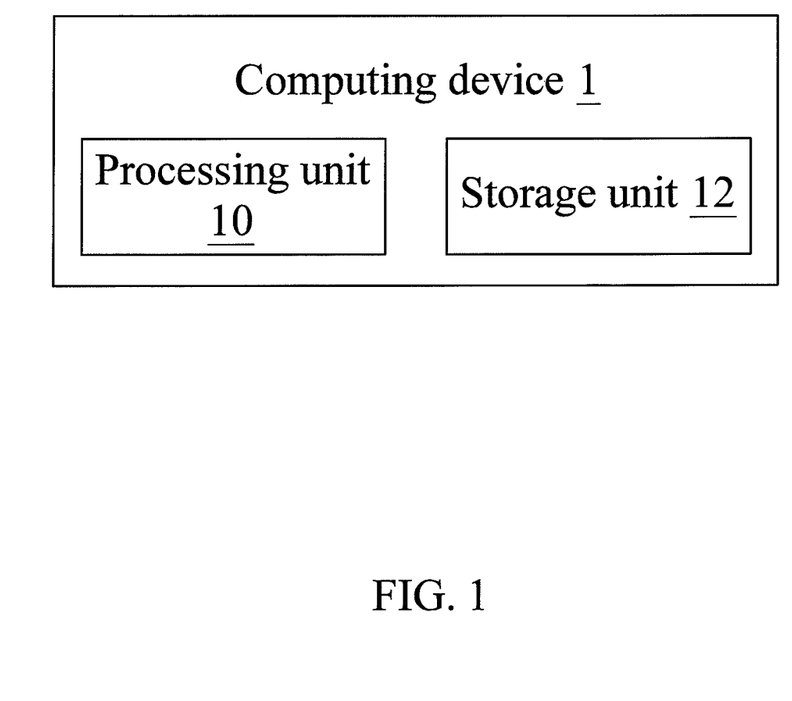
FIG. 1 is block diagram of a structure of a computing device to which the method of the present invention may be applied.
Figure 2:
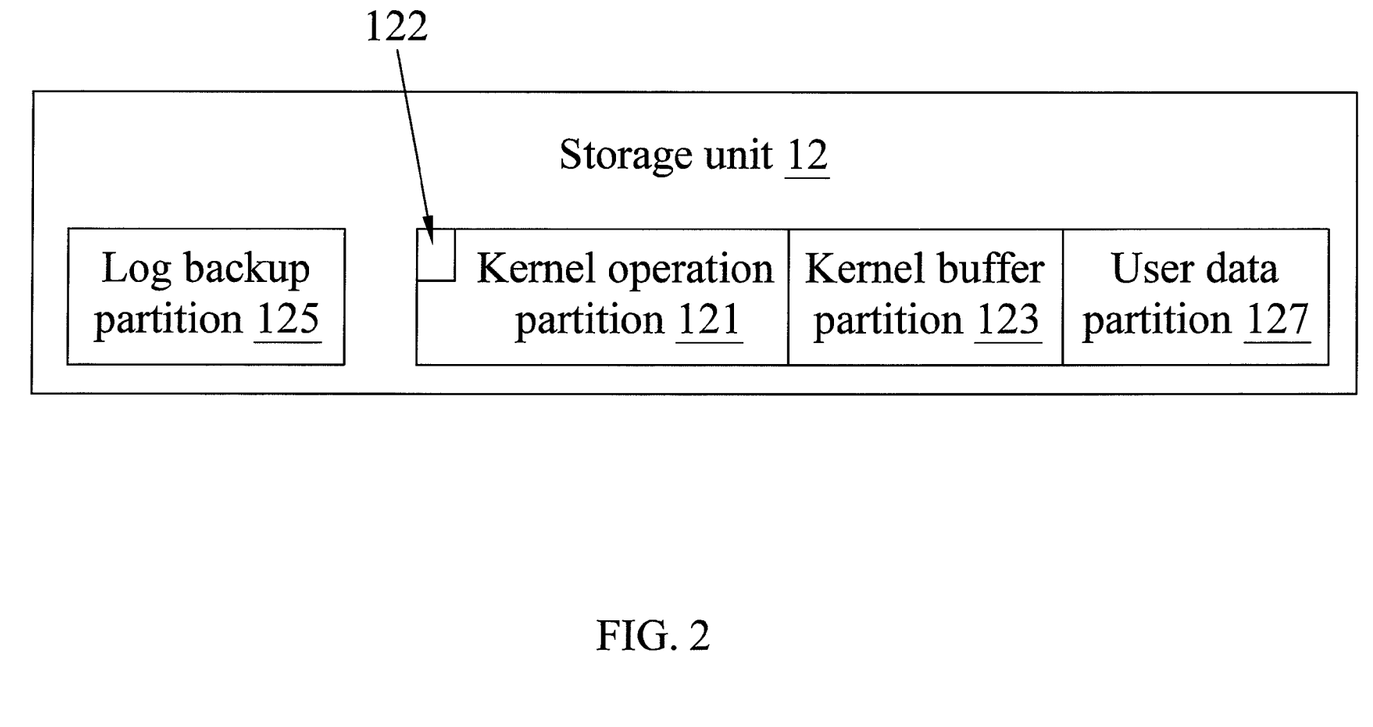
FIG. 2 illustrates partitions of a storage unit of the computing device.

The invention provides a method for reading a kernel log, upon a kernel panic, in an operation system which uses a kernel. The method is applicable to a computing device. FIG. 1 is block diagram of a structure of a computing device to which the method of the present invention may be applied. With reference to FIG. 1, a computing device 1 includes a processing unit 10 and a storage unit 12. The computing device 1 may be e.g. a personal computer (PC), a notebook computer (NB), a smart phone, a navigation device, a tablet computer or a personal digital assistant (PDA), and the processing unit 10 may be e.g. a central processing unit (CPU). FIG. 2 illustrates partitions of a storage unit 12 of the computing device 1. With reference to FIGS. 1 and 2, the storage unit 12 may be a flash memory electrically coupled to the processing unit 10 for receiving data transmitted from the processing unit 10 and transmitting data stored therein to the processing unit 10. The storage unit 12 includes a kernel operation partition 121, a kernel buffer partition 123, a log backup partition 125 and a user data partition 127.

It is noted that when different operating systems (e.g., UNIX, Linux and FreeBSD) are applied in different computing devices, different partitions are programmed according to actual needs. For instance, when a smart phone is operated with an Android system, partitions are programmed as follows:

(1) Hboot partition: It is mainly used for starting a computing device, thereby detecting hardware message of the computing device 1 and searching for each partitions programmed by the operating system.

(2) Radio partition: It is mainly used for driving communication hardware so that the computing device may perform a communication operation, such as making a call or sending a message.

(3) Recovery partition: It is mainly used for storing backup data required for recovering the operating system.

(4) Boot partition: It is mainly used as a storage partition of a system kernel.

(5) System partition: It is mainly used for a storage partition of built-in programs.

(6) Cache partition: It is mainly used as a system buffer partition.

(7) Userdata partition: It is mainly used for storing user data.

It's also noted that relatively generic terms are used to designate partitions involved in the method of the invention, and to describe operations involving the partitions. Referring to FIGS. 1 and 2, the kernel operation partition 121, the kernel buffer partition 123 and the user data partition 127 of the storage unit 12 are conventional partitions. For example, the kernel operation partition 121 may be a general name for the hboot partition, the recovery partition, the boot partition and the system partition, the kernel buffer partition 123 may be a cache partition, and the user data partition 127 may be the userdata partition. Wherein, the kernel operation partition 121 refers to e.g. a plurality of partitions required for normal operation of the kernel. As to the kernel buffer partition 123 and the user data partition 127, they may be involved in embodiments of the method of the present invention, so they are regarded apart from the kernel operation partition 121. Depending on definition, design or structure of partitions of the storage unit 12 in a particular application, the kernel buffer partition 123 and the user data partition 127 may be of a kernel operation partition. In addition, the log backup partition 125 used in an embodiment of the present invention may not be a conventional partition, but an additional dedicated memory area in the storage unit 12, so that when there is a kernel panic in the operating system, the log backup partition 125 will not be affected or damaged by the kernel panic.

Referring to FIGS. 1 and 2, a system kernel 122 is included in the kernel operation partition 121, and the processing unit 10 is provided for executing an operating system by the system kernel 122 so as to drive other hardware devices, such as an optical disk, a display card or a Bluetooth module, of the computing device 1. When the processing unit 10 executes the operating system, the processing unit 10 may generate a kernel log according to the information of the execution process. In addition, the processing unit 10 may write the kernel log into the kernel buffer partition 123 in the same way as the prior art, so that users may output the kernel log from the kernel buffer partition 123 by using the "cat/proc/kmsg" command in the Linux system to check the operation status of the Linux kernel. In addition, the processing unit 10 of the computing device 1 may further write the kernel log into the additional log backup partition 125. In other words, the kernel log generated in the present invention may be stored in both the kernel buffer partition 123 and the log backup partition 125 e.g. simultaneously.

Figure 3:
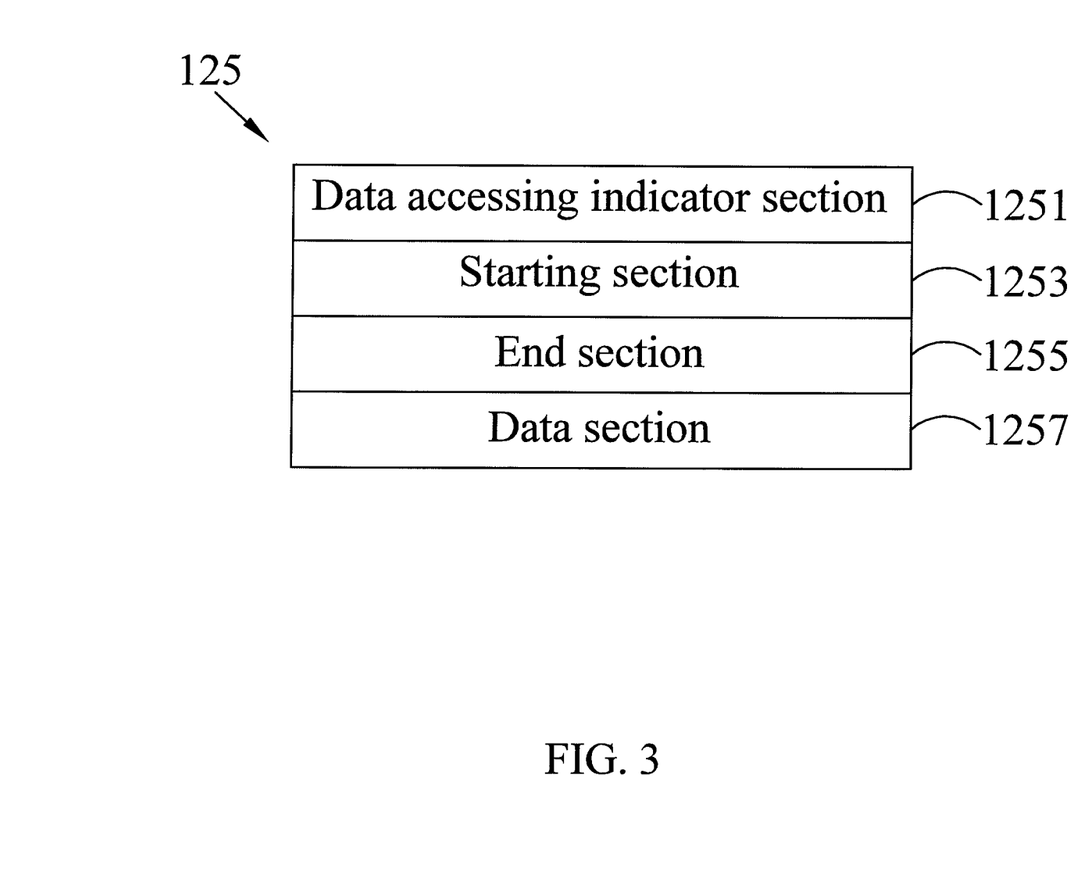
FIG. 3 illustrates a log backup partition of the storage unit.
Figure 4:
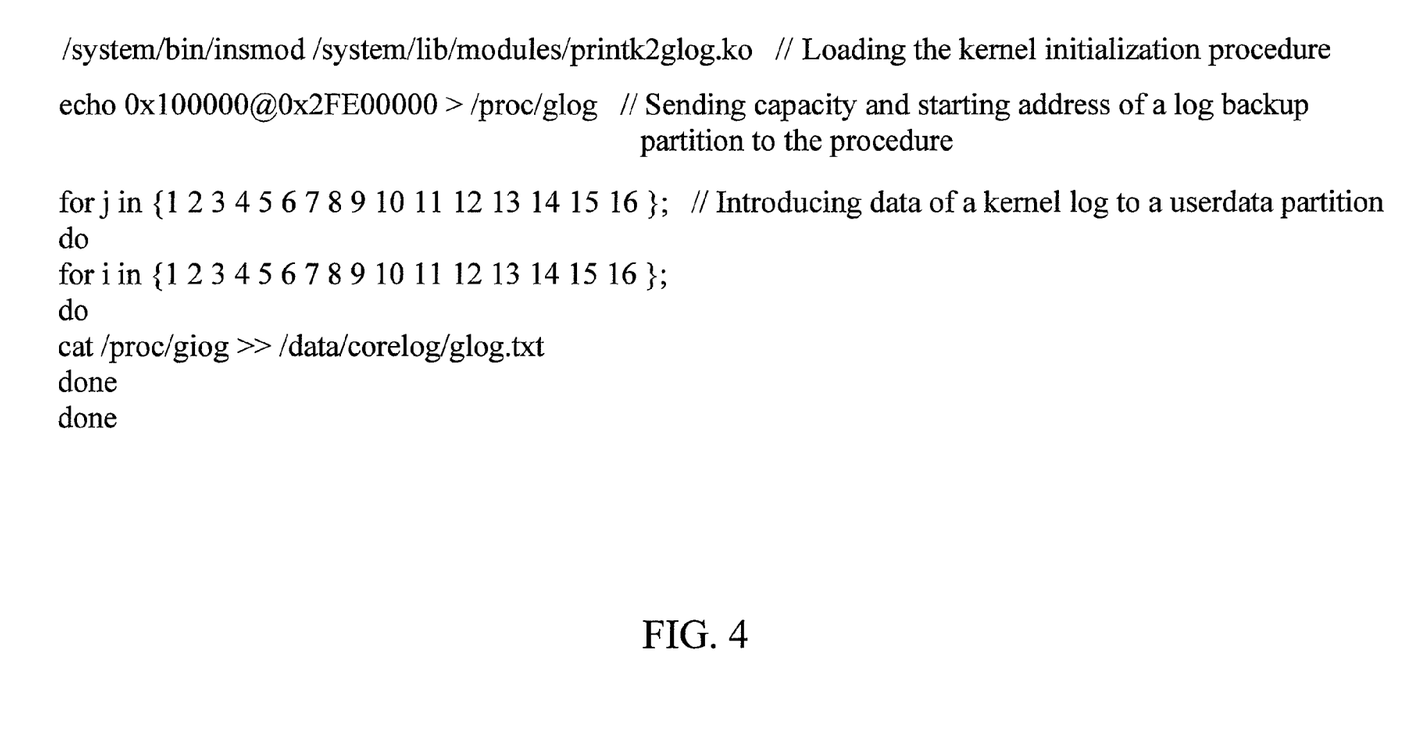
FIG. 4 shows some script contents of a kernel initialization procedure performed by the computing device in an embodiment of the present invention.

Referring to FIGS. 1 and 3, the log backup partition 125 includes a data accessing indicator section 1251, a starting section 1253, an end section 1255 and a data section 1257, wherein the data accessing indicator section 1251 stores a data accessing indicator, and the data accessing indicator can be in one of at least three statuses: a write status, a read status, and an unknown status. It's noted that the write status means the status of the data accessing indicator is set as permitting writing into (a data section of) the log backup partition, the read status means the status of the data accessing indicator is set as permitting reading the kernel log in (the data section of) the log backup partition. So called unknown status means it's unknown which of the write status and the read status is the current status of the data accessing indicator. In a preferred embodiment of the present invention, a numerical value "0xbeefbeef" of the data accessing indicator represents the write status and a numerical value "0xfaceface" of the data accessing indicator represents the read status, and any numerical value other than those given above represents the unknown status. When the computing device 1 is turned on for the first time or rebooted after a normal shutdown process, the data accessing indicator would be in the unknown status, and the processing unit 10 may set the data accessing indicator to permit writing or reading according to the using requirement of the operating system. When the data accessing indicator is in the write status, the processing unit 10 may write the kernel log into the data section 1257, and the starting address of the kernel log in the data section 1257 is recorded into the starting section 1253 to produce a numerical value of the starting address. Further, the end address of the kernel log in the data section 1257 is recorded into the end section 1255 to produce a numerical value of the end address. When the data accessing indicator is in the read status, the processing unit 10 just can read the kernel log from the data section 1257 only, and the content of the kernel log corresponding to the numerical values of the starting address and the end address from the data section 1257.

Referring to FIGS. 1-3, when a user turns on a computing device 1 for the first time or reboots the computing device 1 with normally shutdown process, the processing unit 10 will execute a kernel initialization procedure and read the data accessing indicator. If the data accessing indicator is determined to be in the unknown status, the data accessing indicator will be set to the write status so that the kernel log may be written into the data section 1257 when executing the operating system afterwards. When there is a kernel panic of the operating system, the user may apply hard reset to the processing unit 10, namely, making short of reset pin of the processing unit 10. Now, the processing unit 10 will execute the kernel initialization procedure and read the data accessing indicator. When the data accessing indicator is determined to be in the write status, it represents that the operating system is not turned off through a normal turn-off process, so that the data accessing indicator is not in the unknown status. Therefore, the processing unit 10 will set the data accessing indicator into the read status, and reads the numerical values of the starting address and the end address from the starting section 1253 and the end section 1255. Then the processing unit 10 will read the kernel log from the data section 1257 according to the numerical values of the starting address and the end address and write the kernel log into the user data partition 127. Further, the processing unit 10 will set the data accessing indicator into the write status to facilitate writing the kernel log into the log backup partition 125 during the execution of the operating system. In addition, when the kernel panic occurs again during the processing unit 10 sets the data accessing indicator into the read status without reading out the whole kernel log, the processing unit 10 will carry out the kernel initialization procedure again after the hardware reset. If the data accessing indicator is determined to be in the read status, the kernel log will be read out from the data section 1257 according to the numerical values of the starting address and the end address and the data accessing indicator will be set into the write status after the kernel log is written into the user data partition 127.

With reference to FIGS. 1-4, FIG. 4 is a schematic view of the script content and the description of a kernel initialization procedure in an embodiment of the present invention, wherein "printk2glog.ko" is the name of the kernel initialization procedure. However, manufacturers can change the name as they need. In addition, "0x100000" is the capacity of the log backup partition 125, and "0x2FE00000" is the starting address of the log backup partition 125. In this preferred embodiment, the capacity of the log backup partition 125 is 1 MB. As the microelectronic technology advances, manufacturers can also increase the capacity of the log backup partition 125 when the capacity of the storage unit 12 becomes increasingly larger. "glog.txt" is the name of the kernel log. In this preferred embodiment, the processing unit 10 will sequentially read the contents of the kernel log of the data section 1257 at the capacity of 4 Kb each time. As the size of the kernel log, which is glog.txt, it is determined according to the numerical values of the starting address and the end address. It is noted that the capacity of the log backup partition 125 as used in the present invention may be 1 MB (megabytes). If the size of a kernel log written by the operating system is greater than 1 MB, the last written-in content of the kernel log will overwrite the content of the previously written-in kernel log. In other words, the numerical value of the starting address is equal to the numerical value of the end address plus 1 in order to avoid the numerical value of the starting address being equal to that of the end address and causing an incorrect content of the kernel log outputted by the processing unit 10.

Figure 5:
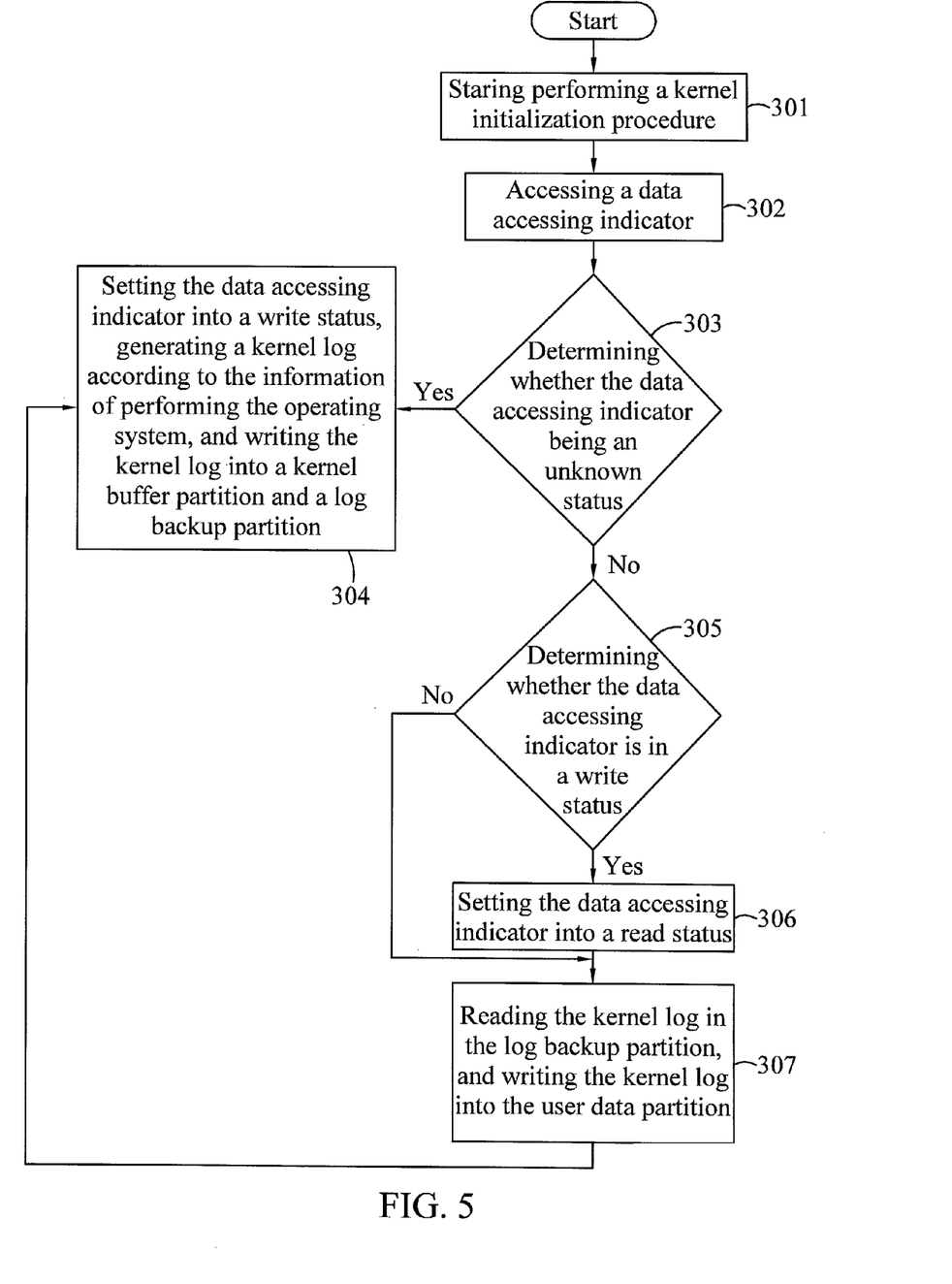
FIG. 5 is a flow chart of the computing device reading and then writing a kernel log according to an embodiment of the present invention.

To clearly disclose the method of the foregoing preferred embodiment, the flow chart of the kernel initialization procedure performed by the processing unit 10 in an embodiment of the present invention is illustrated in FIGS. 1-3 and 5. In this embodiment, the kernel initialization procedure includes the following steps:

Step (301): Starting performing a kernel initialization procedure.

Step (302): Accessing a data accessing indicator.

Step (303): Determining whether the data accessing indicator is in an unknown status; if yes, then go to Step (304), or else go to Step (305).

Step (304): Setting the data accessing indicator into a write status, generating a kernel log according to the information of performing the operating system, and writing the kernel log into a kernel buffer partition 123 and a log backup partition 125.

Step (305): Determining whether the data accessing indicator is in a write status; if yes, then go to Step (306), or else go to Step (307).

Step (306): Setting the data accessing indicator into a read status, and go to Step (307).

Step (307): Reading the kernel log in the log backup partition 125, and writing the kernel log into the user data partition 127, and go to Step (304).

Referring to FIGS. 1-3, when the processing unit 10 has undergone hardware reset, the data accessing indicator will not restore to the unknown status. Thus, the processing unit 10 will automatically write the kernel log into the user data partition 127 from the log backup partition 125, so that the user may only need to output the kernel log from the user data partition 127 to check the operation status of the operating system before the processing unit 10 has undergone hardware reset, so as to find out the cause of the kernel panic. Unlike the prior art, including the panic mechanism and kdump mechanism, the present invention does not require a complicated setup before obtaining the kernel log. As described above, the log backup partition 125 used in an embodiment of the present invention may be a specially created partition in the storage unit 12 instead of a conventional partition of the original operating system, such as the Linux system, so that the log backup partition 125 will not be affected when there is a kernel panic of the operating system, thereby assuring the integrity of the kernel log.

Referring to FIGS. 1-3, the processing unit 10 has undergone hardware reset as described in the previous preferred embodiment, but manufacturers can also install a monitoring program, such as a watchdog, to the operating system in other preferred embodiments. When the monitoring program discovers any abnormalities of the operating system, the monitoring program may send a resetting signal to the processing unit 10. After the processing unit 10 receives the resetting signal, the processing unit 10 will carry out Steps (301)-(307) as described above. Both performing a hard resetting of the processing unit 10 by users directly and sending the resetting signal to the processing unit 10 by the monitoring program represent or may count as resetting of the processing unit 10. Therefore, the processing unit 10 will execute the kernel initialization procedure after the processing unit 10 is reset, and the additionally created log backup partition 125 reads the kernel log, and then saves the kernel log into the user data partition 127. Such arrangements also fall within the scope of the present invention.

While specific embodiments of the present invention has been described with accompanying drawings, numerous modifications and variations could be made thereto by those skilled in the art without departing from the scope and spirit of the invention set forth in the claims. The modifications and variations should generally not be limited by the specification of the present application.

What is claimed is:

1. A method for reading a kernel log, upon a kernel panic, in an operation system which uses a kernel, the method being applicable to a computing device including a processing unit and a storage unit electrically coupled to the processing unit and including a log backup partition and a user data partition, the storage unit for storing the kernel, the method comprising:
the computing device performing the operating system by the kernel;
the computing device generating a kernel log upon performing the operating system, and
writing the kernel log into the log backup partition; and
upon a kernel panic occurring and then the processing unit being reset, the computing device performing a kernel initialization procedure, wherein the kernel log in the log backup partition includes information of a process of operating the kernel which was operating before the processing unit was reset, and
wherein the log backup partition includes a data accessing indicator section storing a data accessing indicator, the step of writing the kernel log into the log backup partition includes writing the kernel log into a data section of the log backup partition, and the kernel initialization procedure further comprises the following:
accessing the data accessing indicator to determine a status of the data accessing indicator;
if determined that the status of the data accessing indicator is set as permitting writing into the data section, setting the status of the data accessing indicator as permitting reading the kernel log in the data section of the log backup partition, and reading and then writing the kernel log on the log backup partition into the user data partition;
if determined that the status of the data accessing indicator is set to an unknown status, setting the data accessing indicator into a write status, generating a new kernel log, and writing the new kernel log onto a kernel buffer partition and the log backup partition.

2. The method of claim 1, wherein the log backup partition includes a starting section of data writing and an end section of data writing, the starting section points to a starting address, the end section points to an end address, the kernel log is written into the data section from the starting address to the end address, and the initialization procedure further comprises accessing the starting address and the end address for reading the kernel log in the data section of the log backup partition.

3. The method of claim 1, further comprising the computing device setting the status of the data accessing indicator as permitting writing into the data section, upon writing the kernel log in the log backup partition into the user data partition.

4. The method of claim 1, wherein the condition of the processing unit being reset is by hard resetting the processing unit.

5. The method of claim 1, wherein a monitoring program is installed with the operating system, and the method further comprises the following step upon the kernel panic occurring:
performing the monitoring program to transmit a resetting signal to the processing unit for resetting the processing unit.

6. A method for reading a kernel log, upon a kernel panic, in an operation system which uses a kernel, the method being applicable to a computing device including a processing unit and a storage unit electrically coupled to the processing unit and including a log backup partition and a user data partition, the storage unit for storing the kernel, the method comprising:
the computing device performing the operating system by the kernel;
the computing device generating a kernel log upon performing the operating system, and writing the kernel log into the log backup partition;
providing a data accessing indicator section storing a data accessing indicator, the data accessing indicator being configured for determining if the kernel panic has occurred; and
upon a kernel panic occurring and then the processing unit being reset, the computing device performing a kernel initialization procedure, wherein the kernel log in the log backup partition includes information of a process of operating the kernel which was operating before the processing unit was reset,
wherein the step of writing the kernel log into the log backup partition includes writing the kernel log into a data section of the log backup partition, and the kernel initialization procedure further comprises the following steps:
accessing the data accessing indicator to determine a status of the data accessing indicator; and
if determined that the status of the data accessing indicator is set as permitting writing into the data section, setting the status of the data accessing indicator as permitting reading the kernel log in the data section of the log backup partition, and reading and then writing the kernel log in the log backup partition into the user data partition, wherein when the computing device is turned on for the first time or rebooted after a normal shutdown process, the status of the data accessing indicator is set as an unknown status, and if the kernel panic occurred, the status of the data accessing indicator is not set as the unknown status, and if determining that the status of the data accessing indicator is set as the unknown status, setting the status of the data accessing indicator as permitting writing a new kernel log in the data section of the log backup partition.

7. The method of claim 6, wherein the log backup partition includes a starting section of data writing and an end section of data writing, the starting section points to a starting address, the end section points to an end address, the kernel log is written into the data section from the starting address to the end address, and the initialization procedure further comprises accessing the starting address and the end address for reading the kernel log in the data section of the log backup partition.

8. The method of claim 6, further comprising the computer device setting the status of the data accessing indicator as permitting writing into the data section, upon writing the kernel log in the log backup partition into the user data partition.

9. The method of claim 6, wherein the condition of the processing unit being reset is by hard resetting the processing unit.

10. The method of claim 6, wherein a monitoring program is installed with the operating system, and the method further comprises the following step upon the kernel panic occurring:

performing the monitoring program to transmit a resetting signal to the processing unit for resetting the processing unit.

* * * * *